United States Patent [19]

Scherer et al.

[11] 4,159,185

[45] Jun. 26, 1979

[54] FERRULE FOR HIGH VOLTAGE FUSE AND METHOD OF FABRICATION THEREOF

[75] Inventors: Henry W. Scherer, Mt. Prospect; Raymond W. Loris, Des Plaines, both of Ill.

[73] Assignee: S&C Electric Company, Chicago, Ill.

[21] Appl. No.: 740,930

[22] Filed: Nov. 11, 1976

[51] Int. Cl.$^2$ .................................. F16B 3/00

[52] U.S. Cl. .................................. 403/13; 403/375; 337/173; 339/186 R

[58] Field of Search .................. 403/13, 14, 349, 375; 72/117, 120, 355, 370; 337/171, 172, 173, 174, 175, 201, 202; 339/184 R, 186 R, 65; 29/523, 521

[56] References Cited

U.S. PATENT DOCUMENTS

| | | | |
|---|---|---|---|
| 788,200 | 4/1905 | Finch | 403/349 X |
| 2,377,406 | 6/1945 | Dedrick | 72/120 X |
| 2,587,522 | 2/1952 | Pilkington, Jr. | 29/521 UX |
| 2,955,176 | 10/1960 | McCloud | 337/173 X |
| 3,082,396 | 3/1963 | Bernhard | 339/186 R |
| 3,176,100 | 3/1965 | Barta | 337/239 |
| 3,267,232 | 8/1966 | Chapin | 200/83 WM |
| 3,575,683 | 4/1971 | Fahnoe | 337/282 |
| 3,855,563 | 12/1974 | Cameron et al. | 337/221 |
| 3,960,435 | 6/1976 | Bailey | 339/186 R |

*Primary Examiner*—Andrew V. Kundrat
*Attorney, Agent, or Firm*—Kirkland & Ellis

[57] ABSTRACT

A high voltage dropout type expulsion fuse has a lower trunnion assembly mounted on one end and a fuse release assembly mounted on the other end thereof. To assure the proper positional relationship between the trunnion assembly and the fuse release assembly, the fuse housing has a locating boss at one end adapted to engage and position the trunnion assembly and a positioning slot formed in the other end adapted to engage and position the fuse release assembly. The locating slot and boss must be properly positioned with respect to one another to assure the proper positional relationship of the trunnion assembly and the fuse release assembly. The lower locating boss is integrally formed on the wall of a metallic ferrule by extruding a portion of the wall into the cavity of a die to form an integral locating boss. This integral boss cannot cause the leakage of moisture into the interior of the fuse. The boss is formed by first determining the desired location of the boss by measuring the correct positional relationship with respect to the locating slot, positioning a die having a cavity at a position where the boss is to be located at the exterior of the ferrule wall, and extruding a portion of the wall of the ferrule into the cavity to form the locating boss. Also, various non-circular shapes of bosses can be conveniently formed in this manner by merely changing the shape of the die and punch. This is advantageous if it is desired to prevent non-compatible end fittings, e.g. trunnion assemblies, from being used.

4 Claims, 6 Drawing Figures

FERRULE FOR HIGH VOLTAGE FUSE AND METHOD OF FABRICATION THEREOF

BACKGROUND OF THE INVENTION

1. Field of the Invention

The present invention relates to contact ferrules for high voltage fuses, and more particularly, to the unique method of making ferrules having integrally formed locating bosses.

2. Description of the Prior Art

High voltage expulsion type fuses are well known in the art as exemplified by U.S. Pat. Nos. 3,267,232—Barta, 3,176,100—Barta, 3,575,683—Fahnoe, and 3,855,563—Cameron. Such high voltage expulsion fuses typically are mounted in dropout type mountings so that when the fuse operates, the fuse "drops out" of the mounting under the force of gravity to visually indicate fuse operation. Dropout type fuse mountings are typically specially adapted for this purpose, and it is necessary to mount on one end of the end of the fuse a trunnion assembly which engages the lower dropout mounting and mount a fuse release mechanism on the other fuse which engages the upper dropout mounting. Since such terminal mountings are typically permanently installed in the field, it is necessary for the fuse to be specifically dimensioned to fit these mountings. Further, since the exact dimensional relationship between the upper and lower terminal mountings is fixed, it is necessary that when the trunnion assembly and fuse release assembly are mounted on the fuse, these assemblies have the desired positional relationship which will permit them to be installed into the fuse mounting. To achieve this purpose, the prior art fuses have had a locating boss on the lower ferrule which engages a slot on the trunnion assembly. At the upper end of the fuse, a locating slot is formed in the side of the insulator tube which will engage a pin on the fuse release assembly to properly position and orient that assembly.

Heretofore, in prior art fuses, the locating boss on the lower ferrule has been provided by drilling a hole through the ferrule and installing a metal pin or rivet through the hole. The pin or rivet is then soldered to effectuate a moisture tight seal since such fuses are typically hermetically sealed to prevent moisture from entering the fuse. However, since the locating boss is a projection which can experience external forces from the trunnion assembly as well as during handling, it is possible that the solder seal around the pin or rivet may be broken so that a small leak may develop around the locating boss. Such small leaks are undesirable since any leak, regardless of how small, can result in the ingress of moisture into the fuse with resultant damage or deterioration to the interior components.

Further, since it is necessary to provide a correct positional relationship for the locating boss, it is extremely difficult to pre-drill the holes for the rivets or pins prior to installation of the ferrule on the fuse since the position of the ferrule may vary as a result of assembly techniques.

Also, it is difficult to provide non-circular shaped rivets or pins when it is desirable to employ non-circular locating bosses to control interchangeability between different types of fuse units and trunnion assemblies.

Thus, it would be a desirable advance in the art to provide an integral leak-free locating boss of a predetermined shape on a lower ferrule of a high voltage fuse which can be correctly positioned after the ferrule is installed on the fuse.

BRIEF DESCRIPTION OF THE INVENTION

A metallic ferrule for a high voltage fuse in accordance with the present invention comprises a hollow tubular member having a wall being fabricated from metal and a locating boss integrally formed on the wall by extruding a portion of the wall into a cavity in a die.

The locating boss is extruded by positioning a die having a cavity against the exterior wall of the tubular member so that the cavity is located at a position where the boss is to be formed. The boss is then extruded by pressing a punch against the interior of the wall at a position where the wall will be extruded into the cavity.

One advantage of the present invention and method is that the position of the locating boss can be determined after the fuse has been assembled to assure that the locating boss is in the correct positional relationship with respect to a locating slot at the opposite end of the fuse. An additional advantage of the present invention is that the locating boss is integrally formed with the ferrule so that there is no possibility of leaks around the boss.

Thus, it is a principal object of the present invention to provide a metallic ferrule for a high voltage fuse having a locating boss thereon which is integrally formed on the wall of the ferrule.

Yet another object of the present invention is to provide a method of forming a locating boss of any predetermined shape on the wall of ferrule by extruding a portion of the wall of the ferrule into the form of a locating boss.

Yet another object of the present invention is to provide a leak-proof locating boss for a high voltage fuse.

Yet another object of the present invention is to provide a method of forming a locating boss which permits the position of the locating boss to be determined after the fuse is assembled.

These and other objects, advantages, and features of the present invention shall hereinafter appear, and for the purposes of illustration, but not for limitation, an exemplary embodiment of the present invention is illustrated in the accompanying drawings.

DETAILED DESCRIPTION OF THE PREFERRED EMBODIMENT

Figure 1:
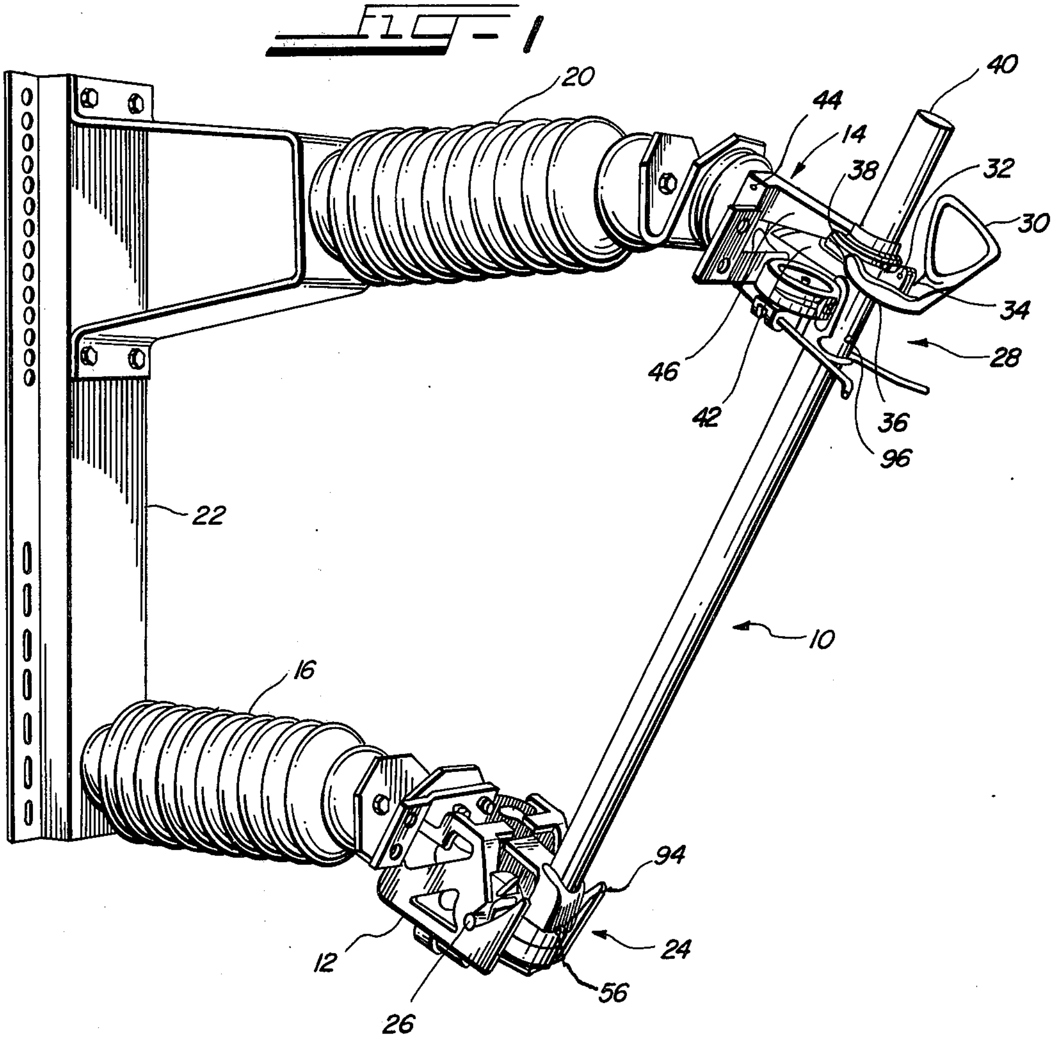
FIG. 1 is a perspective view of a typical fuse arrangement of the type in which the present invention may be employed.

With reference to FIG. 1, a high voltage fuse 10 is shown mounted between a lower mounting terminal 12 and an upper mounting terminal 14. Lower mounting terminal 12 and upper mounting terminal 14 are respectively mounted on the ends of insulators 16 and 20, the other ends of which are mounted to supporting structure 22.

Mounted over the end of fuse 10 is a trunnion assembly 24 which comprises a pin 26 which rides in a groove in lower mounting terminal 12 so that fuse 10 is pivotably mounted on lower mounting terminal 12. Mounted on the other end of fuse 10 is a fuse release assembly 28 which comprises a hook ring 30 pivotably mounted on a bracket 34 by a pin 32. Arms 36 are connected to hook ring 30 and engage a radial flange 38 on a latch release tube 40. Flange 38 engages the end of a latch 46 which is pivotably mounted by a pin 44 to upper mounting terminal 14. Latch 46 is adapted to engage a latch hook 42 so that when hook ring 30 is pivoted and arms 36 push latch release tube 40 and radially extending flange 38 upwardly, latch 46 is pivoted to disengage latch hook 42 so that the fuse can be removed from the upper mounting terminal 14 and pivoted about the lower mounting terminal 12.

It can be seen that to assure the proper operation of the fuse and to assure that the fuse 10 will fit into the upper and lower terminal mountings 12 and 14, it is necessary for the lower trunnion assembly 24 and the fuse release assembly 28 to be properly positioned so that they operably engage the mountings.

Figure 2:
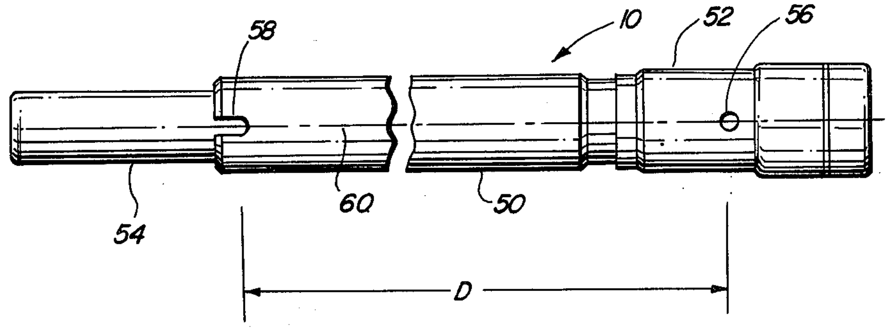
FIG. 2 is a side partially fragmentary view of the fuse illustrated in FIG. 1 showing the position of the locating slot and locating boss.

With reference to FIG. 2, fuse 10 comprises an insulator tube 50, lower metallic ferrule 52 mounted to one end of insulator tube 50 and a conducting tube 54 mounted at the other end of insulator tube 50. Formed in the side wall of metallic ferrule 52, in a manner to be hereinafter described, is a locating boss 56. Formed in the other end of insulator tube 50 is a locating slot 58. Locating boss 56 and locating slot 58 are separated by a dimension D which is determined by the pre-established dimensional separation between the upper and the lower mounting terminals 14 and 12 of the particular arrangement in which the fuse 10 is to be installed. The locating boss 56 and locating slot 58 are also positioned in alignment along a center line 60 along the axis of the fuse 10.

Figure 3:
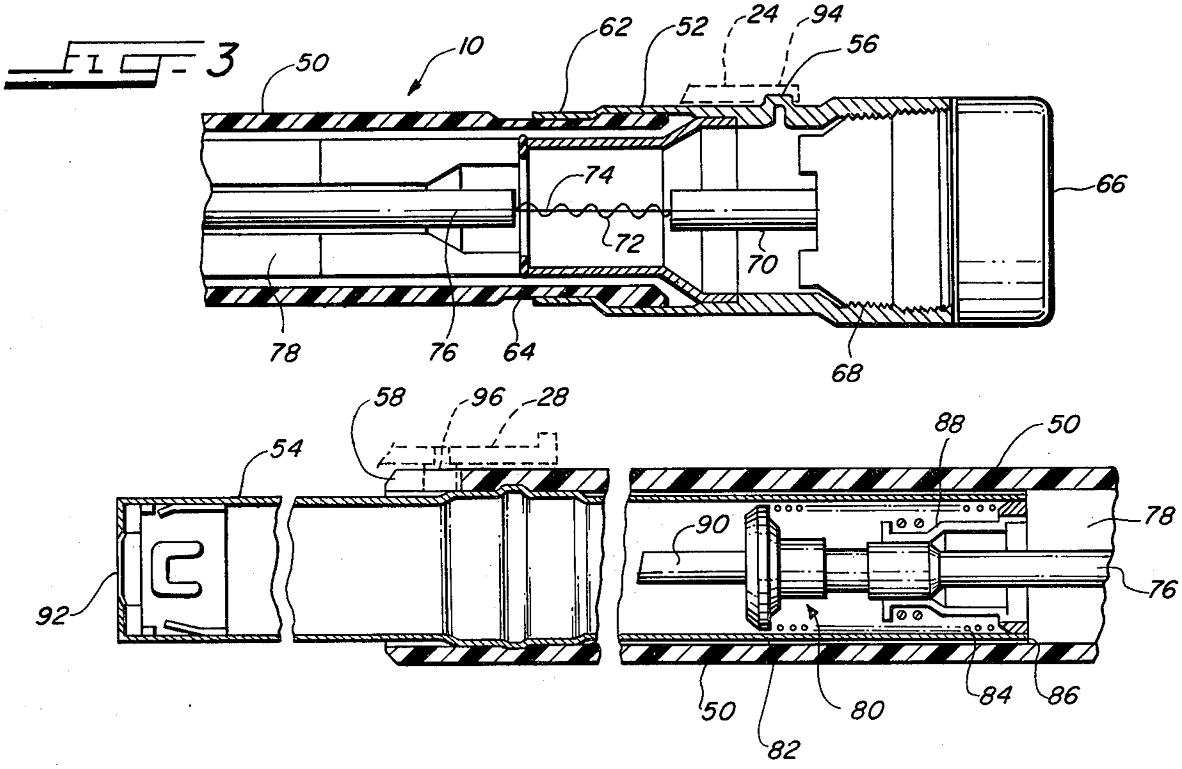
FIG. 3 is a cross-sectional, partially fragmentary view of the fuse illustrated in FIG. 2.

With reference to FIG. 3, fuse 10 is shown in cross-section. A portion of lower trunnion assembly 24 is shown in dotted lines, and a portion of fuse release assembly 28 is also shown in dotted lines. Ferrule 52 is attached to insulator tube 50 by compressing an end 62 of ferrule 52 into an annular slot 64 formed in the end of insulator tube 50. Mounted over the end of metallic ferrule 52 is a rain cap assembly 66. Mounted on threads on the interior of ferrule 52 is a contact bridge 68 upon which is mounted a column-shaped member 70 which extends from bridge 68 in a cantilever fashion. Connected to the end of member 70 is a fusible element 72 which may be fabricated from a silver alloy and a strain wire 74 which may be fabricated from a nickel-chromium alloy. Connected to the other end of fusible element 72 and strain wire 74 is an arcing rod 76 which extends through a hollow opening through a stack of cakes of arc extinguishing material 78. Mounted on the end of arcing rod 76 is a contact button assembly 80 which includes a button flange 82 which compresses a spring 84 between flange 83 and a flange 86 on contact assembly 88 mounted in the end of conducting tube 54. Spring 84 is compressed and biases rod 76 toward movement to the left as viewed in FIG. 3. Arcing rod 76 is held in the position illustrated in FIG. 3 as a result of strain wire 74. However, when fusible element 72 and strain wire 74 melt during fuse operation, the arcing rod and contact button assembly 80 are released and the spring moves the rod very rapidly through the opening through the arc extinguishing material 78 so that the arc is extinguished and current is interrupted. A striker pin 90 on contact button assembly 80 is adapted to pierce a seal 92 at the end of conducting tube 54 so that striker pin 90 will engage the interior of latch release tube 40 (see FIG. 1) to cause latch release tube and radial flange 38 to move upwardly to release the fuse from the upper mounting when the fuse operates.

As can be seen in FIG. 3, locating boss 56 is integrally formed in the wall of metallic ferrule 52. Locating boss 56 is adapted to engage a slot 94 in trunnion assembly 24 (see FIG. 1 and the dotted lines in FIG. 3) to properly position trunnion assembly 24 with respect to the fuse release assembly 28.

Fuse release assembly 28 has a pin 96 mounted in the wall thereof which extends inwardly and is adapted to engage slot 58 in insulator tube 50 to properly position fuse release assembly 28 (see dotted lines in FIG. 3).

Figure 4:
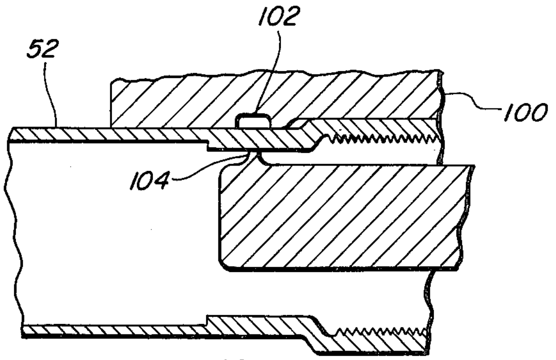
FIG. 4 is a side cross-sectional, partially fragmentary view of the ferrule of the fuse showing the position of a punch and die prior to formation of the locating boss.
Figure 5:
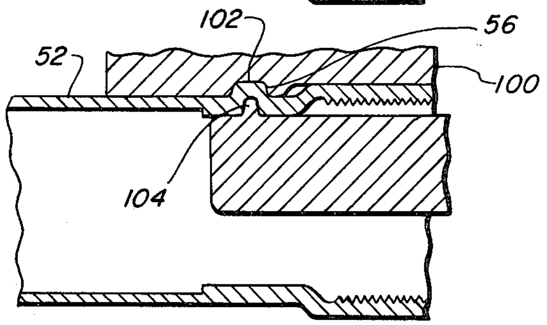
FIG. 5 is a cross-sectional partially fragmentary view showing the extruding of the locating boss.
Figure 6:
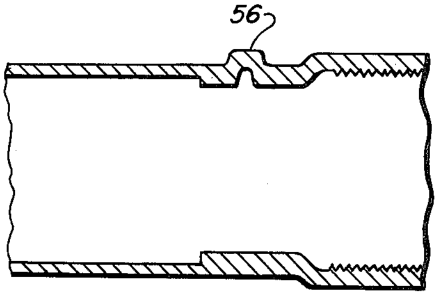
FIG. 6 is a cross-sectional, partially fragmentary view of the exhaust ferrule showing the locating boss after being extruded.

With reference to FIGS. 4, 5, and 6, the method of fabricating locating boss 56 is illustrated. Ferrule 52 is first mounted on the end of insulator tube 50 and the correct dimension D is determined with respect to slot 58 in the other end of insulator tube 50. A die 100 having a cavity 102 is positioned so that the cavity 102 is correctly positioned at the distance D from slot 58 and along the center line 60. A punch 104 is positioned immediately below cavity 102 and after the correct positional relationship is determined, punch 104 is pressed towards cavity 102 so that a portion of the side wall is extruded into cavity 102 as illustrated in FIG. 5. By extruding a portion of the wall of exhaust ferrule 52 to form the locating boss 56, an integral locating boss is formed which prevents any possibility of leaks forming around the edge of the locating boss 56. Further, since the position of the locating boss can be determined after the fuse has been assembled, the correct positional relationship between the locating boss and the locating slot can be correctly ascertained before the locating boss is formed. Thus, once the locating boss has been formed, the die 100 and punch 104 can be removed as illustrated in FIG. 6 so that the remaining portions of the fuse can be installed.

Although, for the purposes of illustration, a round punch and die have been shown to produce a round locating boss, the present invention makes practical the formation of either regular or unsymetrical non-circular shaped seamless bosses, which may serve to identify particular types or manufacture of fuse units and may easily be coordinated with diverse shapes of notches in trunnion assemblies to preclude the union of incorrect fuse-trunnion combinations in service.

A simple reversal of the technique described may be utilized to form a locating pocket or cavity or other locating feature to mate with a male locating member of an associated fitting. This inverse approach makes possible numerous additional simply—produced non-interchangeable fuse end fitting combinations included within the scope of the invention.

It should be apparent to anyone skilled in the art that various changes, alterations, or modifications of the present invention as disclosed and described herein may be effectuated without departing from the spirit and scope of the present invention as defined in the appended claims.

We claim:

1. A contact ferrule for a high voltage fuse comprising:

a hollow metallic tubular member having a wall;

a locating feature integrally formed on the wall by extruding a portion of the wall into a cavity in a die, wherein the location of the locating feature is determined and the feature extruded after the contact ferrule is assembled on the fuse.

2. A contact ferrule, as claimed in claim 1, wherein said locating feature is circular.

3. A contact ferrule, as claimed in claim 1, wherein said locating feature has a predetermined non-circular shape.

4. A contact ferrule, as claimed in claim 1, wherein said locating feature is extruded by positioning a die having a cavity against the wall of the tubular member so that the cavity is located at a position where the feature is to be formed, and pressing a punch against the opposite side of the wall at a position so that a portion of the wall is extruded into the cavity.

* * * * *

UNITED STATES PATENT AND TRADEMARK OFFICE

CERTIFICATE OF CORRECTION

PATENT NO. : 4,159,185

DATED : June 26, 1979

INVENTOR(S) : Henry W. Scherer and Raymond W. Loris

It is certified that error appears in the above-identified patent and that said Letters Patent are hereby corrected as shown below:

Column 1, line 22, delete "end of the".

Column 1, line 24, insert "end of the" after "other".

Signed and Sealed this

***Eleventh* Day of *September 1979***

[SEAL]

*Attest:*

LUTRELLE F. PARKER

*Attesting Officer* *Acting Commissioner of Patents and Trademarks*